(12) United States Patent
Lim

(10) Patent No.: US 11,824,402 B2
(45) Date of Patent: Nov. 21, 2023

(54) APPARATUS FOR COOLING COIL OF MOTOR

(71) Applicant: HYUNDAI MOBIS CO., LTD., Seoul (KR)

(72) Inventor: Jung Yoon Lim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 171 days.

(21) Appl. No.: 17/136,528

(22) Filed: Dec. 29, 2020

(65) Prior Publication Data

US 2021/0226487 A1 Jul. 22, 2021

(30) Foreign Application Priority Data

Jan. 22, 2020 (KR) .......................... 10-2020-0008487

(51) Int. Cl.
*H02K 1/20* (2006.01)
*H02K 5/20* (2006.01)
*H02K 9/193* (2006.01)

(52) U.S. Cl.
CPC ............... *H02K 1/20* (2013.01); *H02K 5/203* (2021.01); *H02K 9/193* (2013.01)

(58) Field of Classification Search
CPC .......... H02K 1/20; H02K 9/193; H02K 5/203; H02K 5/20; H02K 9/19; H02K 9/197
See application file for complete search history.

(56) References Cited

U.S. PATENT DOCUMENTS

| 2,057,637 | A | * | 10/1936 | Schneider | ............... | H02K 9/06 |
| | | | | | | 290/1 R |
| 2012/0242178 | A1 | * | 9/2012 | Miyamoto | ............... | H02K 9/19 |
| | | | | | | 310/54 |
| 2014/0167536 | A1 | * | 6/2014 | Hyun | ....................... | H02K 9/19 |
| | | | | | | 310/54 |
| 2014/0311704 | A1 | * | 10/2014 | Yokoyama | .............. | B60L 3/003 |
| | | | | | | 165/41 |
| 2017/0271940 | A1 | * | 9/2017 | Hanumalagutti | ....... | B29C 41/40 |
| 2017/0310189 | A1 | * | 10/2017 | Hanumalagutti | ...... | H02K 9/197 |
| 2018/0054107 | A1 | * | 2/2018 | Leonardi | ................ | H02K 7/006 |
| 2019/0222091 | A1 | * | 7/2019 | Degner | .................. | H02K 11/25 |

FOREIGN PATENT DOCUMENTS

JP 09285072 A * 10/1997
KR 10-2019-0059231 A 5/2019

OTHER PUBLICATIONS

Wada (JP 09285072 A) shows a cooling system. (Year: 1997).*

* cited by examiner

*Primary Examiner* — Tulsidas C Patel
*Assistant Examiner* — Robert E Mates
(74) *Attorney, Agent, or Firm* — NSIP Law

(57) ABSTRACT

An apparatus for cooling a coil of a motor includes a cooling cap unit covering an end coil of a stator coil bundle, coupled to a stator, and having, formed therein, a flow path through which fluid is able to flow; an inlet flow path unit formed at one part of the cooling cap unit, and forming an inlet path through which fluid is introduced into the cooling cap unit; an outlet flow path unit formed at the other part of the cooling cap unit, and forming an outlet path through which fluid is discharged to an outside of the cooling cap unit; and a cap fixing unit fixing the cooling cap unit to the stator or a motor housing.

19 Claims, 14 Drawing Sheets

APPARATUS FOR COOLING COIL OF MOTOR

CROSS-REFERENCE TO RELATED APPLICATION

This application claims priority from and the benefit of Korean Patent Application No. 10-2020-0008487, filed on Jan. 22, 2020, which is hereby incorporated by reference for all purposes as if set forth herein.

BACKGROUND

Field

Exemplary embodiments of the present disclosure relate to an apparatus for cooling a coil of a motor, and more particularly, to an apparatus for cooling a coil of a motor, which cools a coil provided in a motor.

Discussion of the Background

In general, a hybrid electric vehicle and an electric vehicle are equipped with a drive motor. In order to cool a stator coil which is mainly overheated when the drive motor is driven, a stator and the stator coil which are in direct contact with a motor housing are indirectly cooled by cooling the motor housing, or the stator coil is cooled by directly spraying cooling fluid to the stator coil.

However, in the case of indirectly cooling the stator coil through the motor housing, the cooling efficiency of the stator coil is low, and in the case of cooling the stator coil by directly spraying oil on the stator coil, non-uniform cooling of the stator coil is caused since the oil is not evenly sprayed on the stator coil.

A drive motor for a vehicle is being developed to have higher output so as to gradually replace an internal combustion engine, but its output is still limited due to the above-described difficulties in securing the cooling efficiency and cooling reliability of a stator coil. Therefore, there is a need to solve such a problem.

A background art of the present disclosure is disclosed in Korean Patent Application Publication No. 2019-0059231 (published on May 30, 2019 and entitled "Electric Motor and Stator Cooling Apparatus").

SUMMARY

Various embodiments are directed to an apparatus for cooling a coil of a motor, capable of directly and uniformly cooling a stator coil of a motor, thereby achieving high output of a motor for driving a vehicle.

In an embodiment, an apparatus for cooling a coil of a motor may include: a cooling cap unit covering an end coil of a stator coil bundle, coupled to a stator, and having, formed therein, a flow path through which fluid is able to flow; an inlet flow path unit formed at one part of the cooling cap unit, and forming an inlet path through which fluid is introduced into the cooling cap unit; an outlet flow path unit formed at the other part of the cooling cap unit, and forming an outlet path through which fluid is discharged to an outside of the cooling cap unit; and a cap fixing unit fixing the cooling cap unit to the stator or a motor housing.

The cooling cap unit may include: an inner cover section disposed to face an inner diameter section of the stator coil bundle; an outer cover section disposed to face an outer diameter section of the stator coil bundle; and an end cover section connecting ends of the inner cover section and the outer cover section, and forming a hollow flow path between the inner cover section and the outer cover section.

The inlet flow path unit may obliquely extend in a tangential direction of a concentric circle which has the same center as the stator.

The inlet flow path unit may include: a cap connection inlet section connected with the cooling cap unit, and communicating with an inside of the cooling cap unit; and an extended inlet section connected with the cap connection inlet section, and extending to an outside of the motor housing by passing through the motor housing or connected with a fluid supply device which extends into the motor housing.

The inlet flow path unit may include: a first inlet flow path unit connected to the cooling cap unit to be inclined downward in a clockwise direction; and a second inlet flow path unit disposed in opposition to the first inlet flow path unit, and formed to be inclined downward in a counterclockwise direction.

The inlet flow path unit may be disposed at a lower part of the cooling cap unit; and the outlet flow path unit may be disposed at an upper part of the cooling cap unit so that fluid which is increased in its temperature while passing through the inside of the cooling cap unit and thereby flows upward may be discharged through the outlet flow path unit.

The inlet flow path unit may be disposed at an upper part of the cooling cap unit; and the outlet flow path unit may be disposed at a lower part of the cooling cap unit so that fluid which is increased in its temperature while passing through the inside of the cooling cap unit and thereby flows downward may be discharged through the outlet flow path unit.

The cap fixing unit may include: a flange section formed at an open end of the cooling cap unit to radially project, and brought into contact with the stator.

The cap fixing unit may include: housing coupling sections formed on the cooling cap unit to radially project, and defined with fixing hole parts at positions corresponding to housing locking hole parts which are formed on the stator.

The apparatus may further include: coil passage hole parts formed through the cooling cap unit so that stator coils pass through the coil passage hole parts and extend to the outside of the cooling cap unit.

The apparatus may further include: a vehicle behavior stabilization device connected to the outlet flow path unit, and exhausting air discharged from the outlet flow path unit to a bonnet of a vehicle or between a tire and a fender to apply a downward force to the vehicle.

The apparatus may further include: an oil circulation device having one end which is connected to the inlet flow path unit and the other end which is connected to the outlet flow path unit, and including an oil pump which circulates oil, discharged from the outlet flow path unit, to the inlet flow path unit.

In the apparatus for cooling a coil of a motor according to the embodiments of the present disclosure, an end coil of a stator coil bundle is covered with a cooling cap unit, fluid is supplied into the cooling cap unit through an inlet flow path unit, and the fluid having passed through the inside of the cooling cap unit is discharged through an outlet flow path unit. As a consequence, it is possible to concentratedly and directly cool the end coil of the stator coil bundle from which a largest amount of heat is generated in a motor and to uniformly cool the entirety of end coils.

Accordingly, in the embodiments of the present disclosure, the cooling efficiency and cooling reliability of stator coils may be secured. Also, it is possible to increase the output of a motor that cannot help but be limited to prevent damage due to heat generation of the stator coils when a vehicle is driven at high speed. As a consequence, it is possible to achieve high output of a motor for driving the vehicle.

In addition, the apparatus for cooling a coil of a motor according to the embodiments of the present disclosure may be easily applied by simply coupling cap-shaped compact components, which may be coupled to both ends of a stator in an axial direction, to both ends of a stator, and may be universally applied in parallel with air-cooling type, water-cooling type and oil-cooling type cooling devices which are applied to cool a stator, a rotor and a rotor coil in the existing art.

DETAILED DESCRIPTION OF THE ILLUSTRATED EMBODIMENTS

Hereinafter, an apparatus for cooling a coil of a motor will be described below with reference to the accompanying drawings through various examples of embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosure set forth herein.

Figure 1:
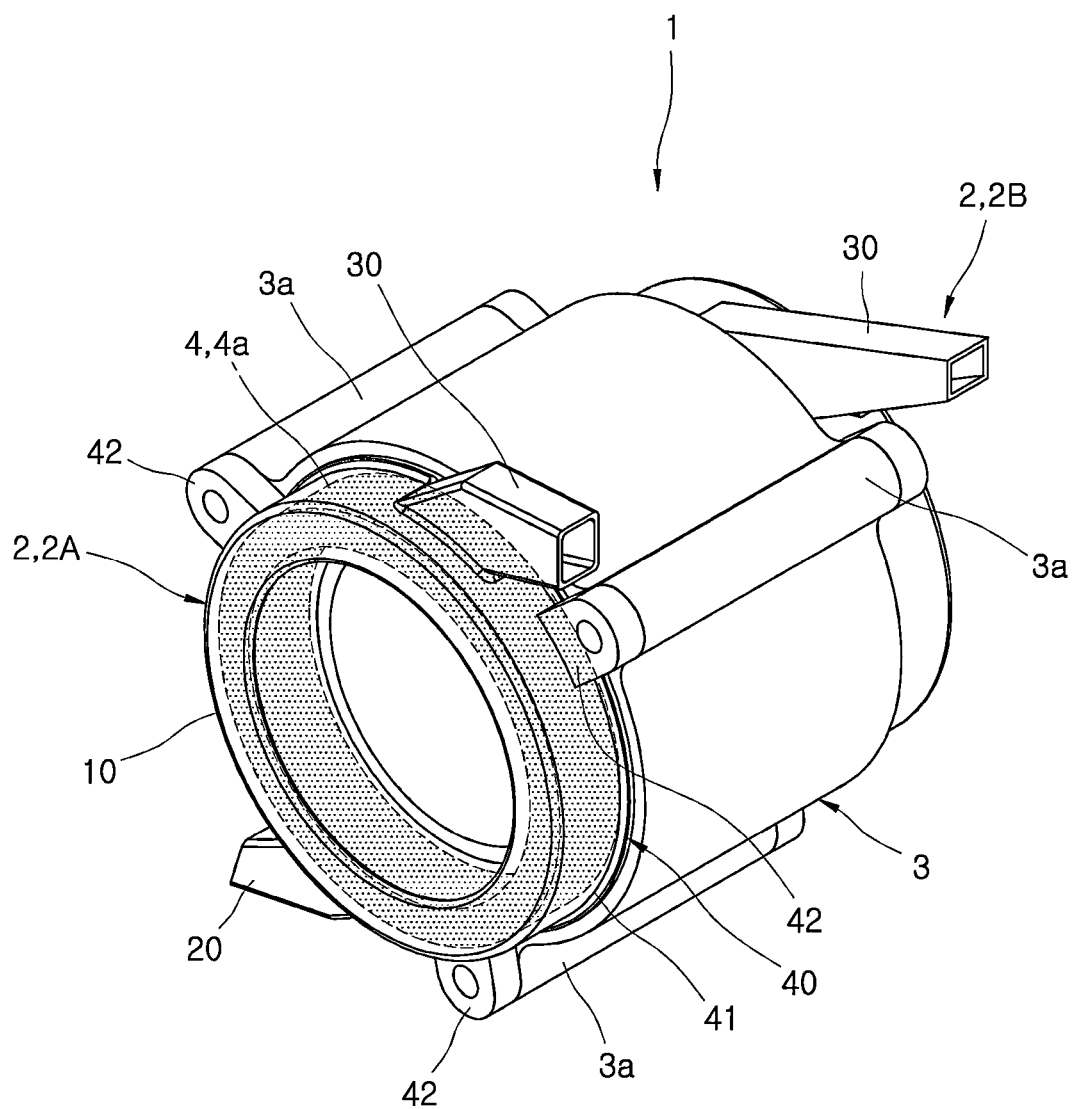
FIG. 1 is a perspective view illustrating a state in which an apparatus for cooling a coil of a motor in accordance with a first embodiment of the present disclosure is installed on a stator.
Figure 2:
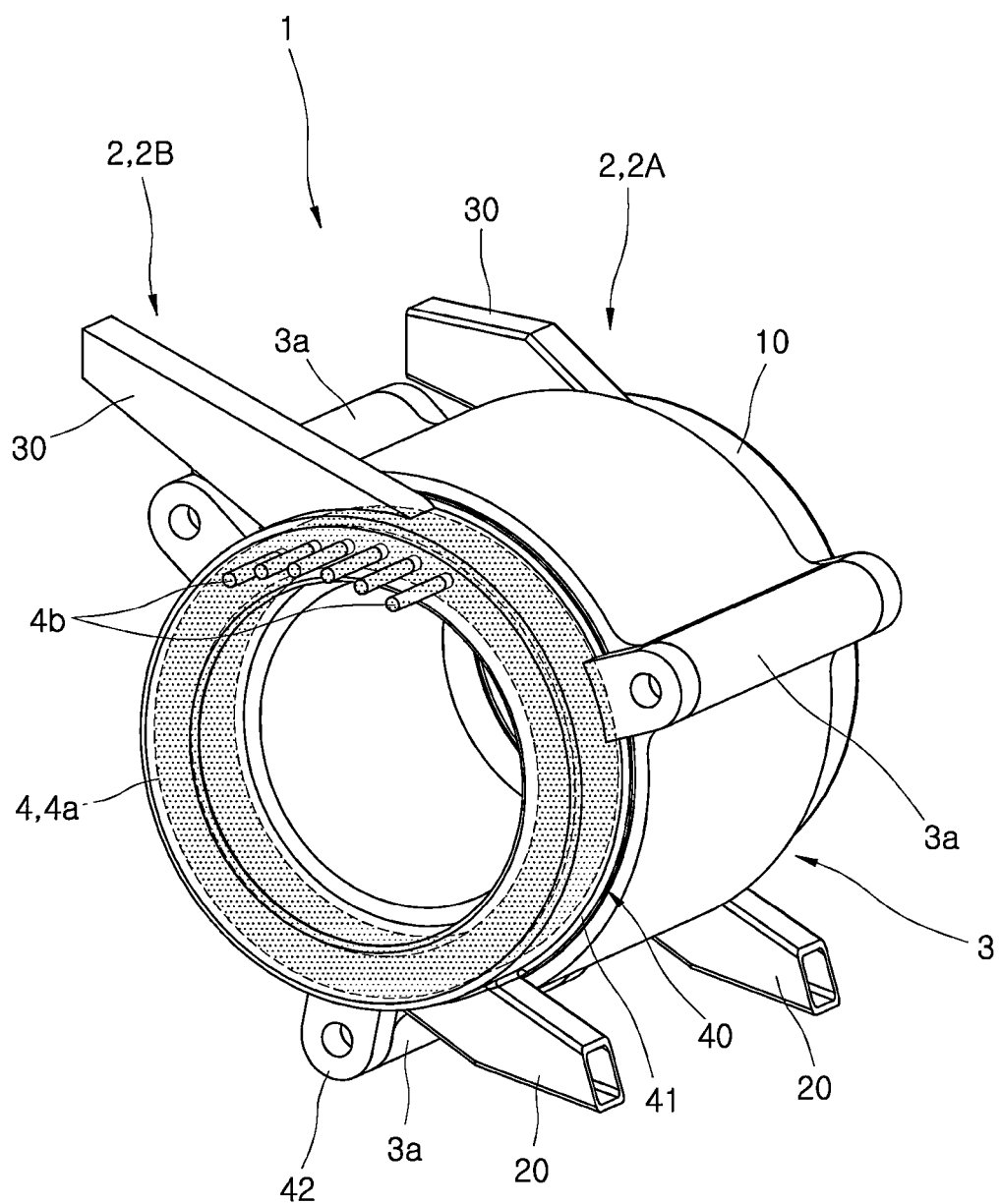
FIG. 2 is a perspective view illustrating, in a direction different from FIG. 1, the state in which the apparatus for cooling a coil of a motor in accordance with the first embodiment of the present disclosure is installed on the stator.

FIG. 1 is a perspective view illustrating a state in which an apparatus for cooling a coil of a motor in accordance with a first embodiment of the present disclosure is installed on a stator, and FIG. 2 is a perspective view illustrating, in a direction different from FIG. 1, the state in which the apparatus for cooling a coil of a motor in accordance with the first embodiment of the present disclosure is installed on the stator.

Referring to FIGS. 1 and 2, an apparatus 2 for cooling a coil of a motor 1 in accordance with the first embodiment of the present disclosure is an apparatus for cooling an end coil 4a of a stator coil bundle 4 coupled to a stator 3, which projects out of the stator 3, and is coupled to the stator 3 while covering the end coil 4a. The coil cooling apparatus 2 in accordance with the first embodiment of the present disclosure includes a first cooling cover 2A and a second cooling cover 2B.

The first cooling cover 2A is installed on one axial end of the stator 3 to concentratedly cool one of a pair of end coils 4a which are disposed to project out of both axial ends of the stator 3. The second cooling cover 2B is installed on the other axial end of the stator 3 to concentratedly cool the other of the pair of end coils 4a.

Figure 3:
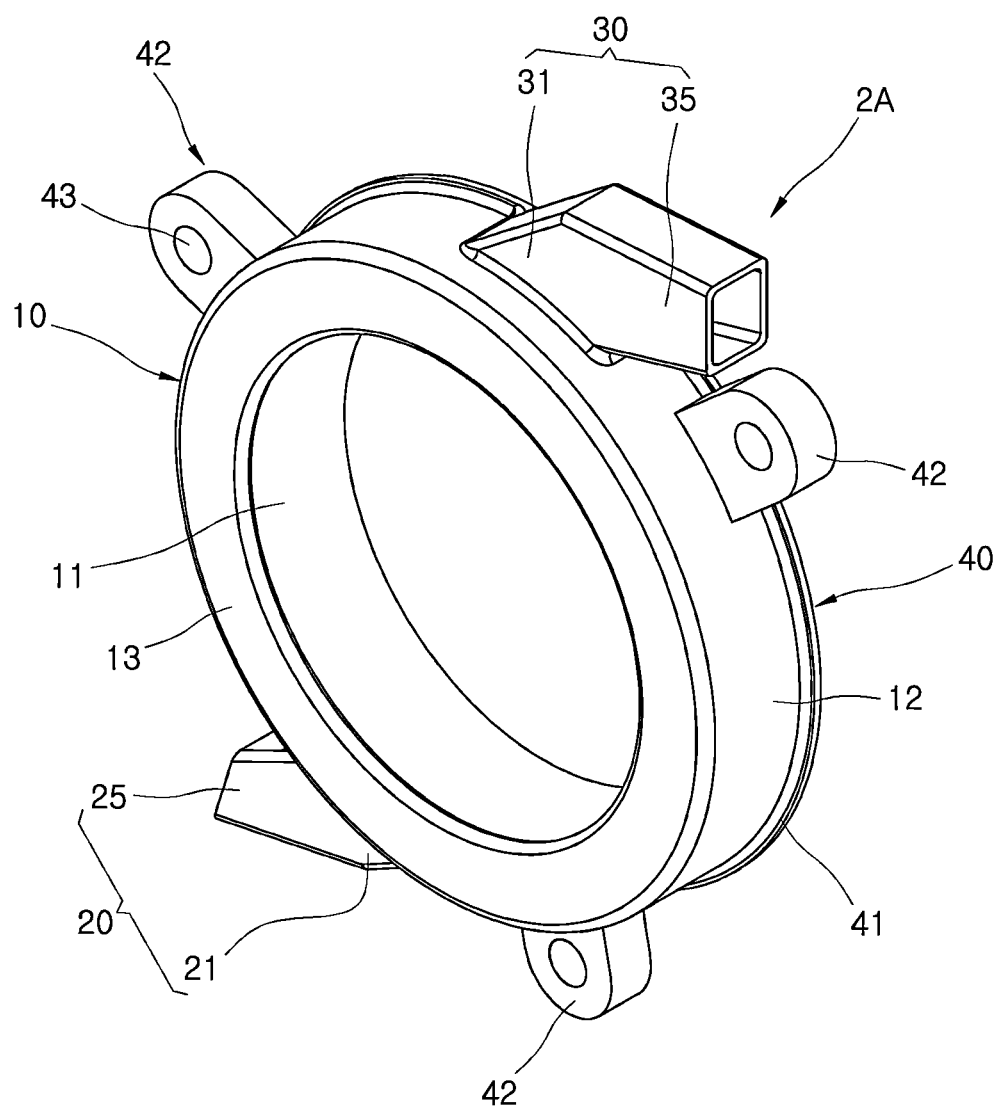
FIG. 3 is a perspective view schematically illustrating a first cooling cover of the apparatus for cooling a coil of a motor in accordance with the first embodiment of the present disclosure.
Figure 4:
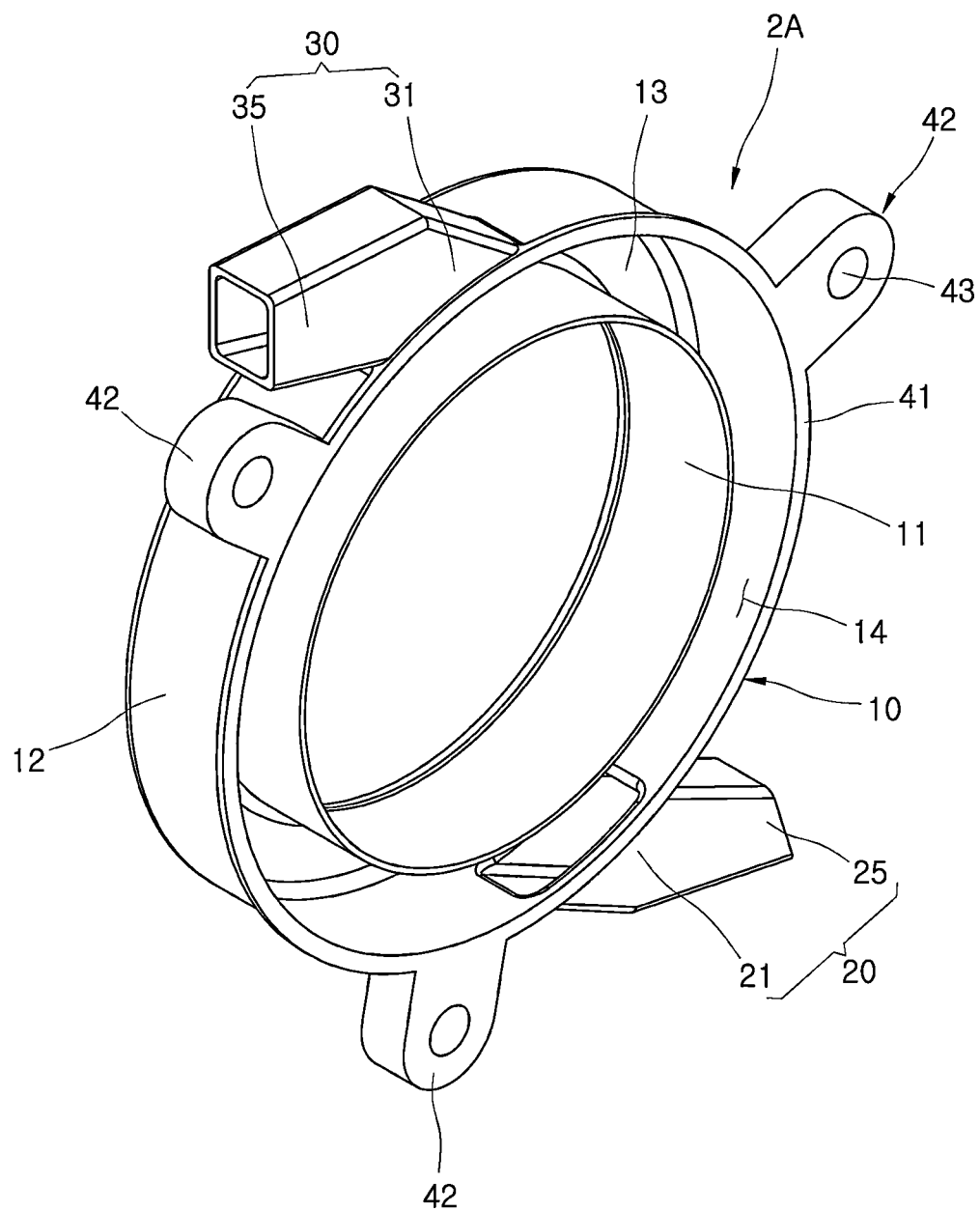
FIG. 4 is a perspective view illustrating, in a direction different from FIG. 3, the first cooling cover of the apparatus for cooling a coil of a motor in accordance with the first embodiment of the present disclosure.
Figure 5:
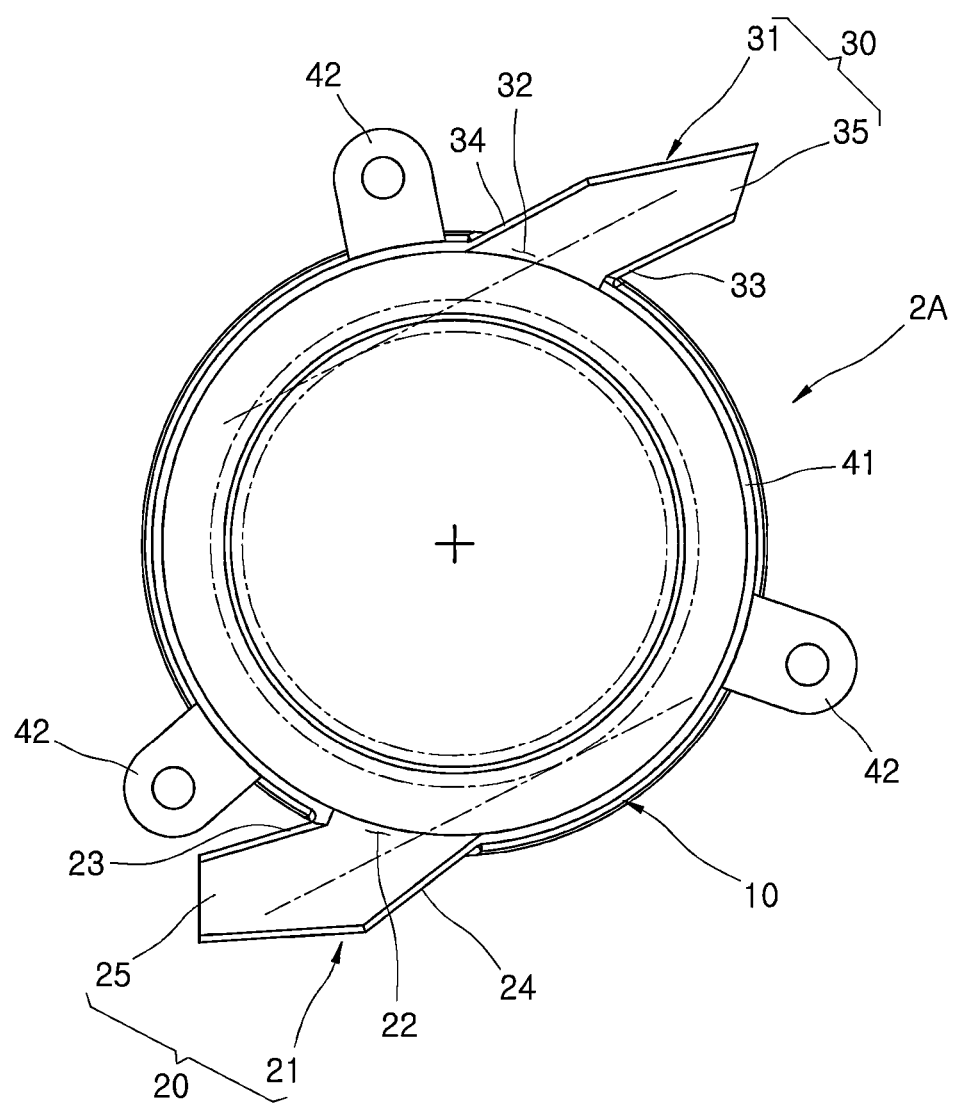
FIG. 5 is a front view schematically illustrating the first cooling cover of the apparatus for cooling a coil of a motor in accordance with the first embodiment of the present disclosure.

FIG. 3 is a perspective view schematically illustrating the first cooling cover of the apparatus for cooling a coil of a motor in accordance with the first embodiment of the present disclosure, FIG. 4 is a perspective view illustrating, in a direction different from FIG. 3, the first cooling cover of the apparatus for cooling a coil of a motor in accordance with the first embodiment of the present disclosure, and FIG. 5 is a front view schematically illustrating the first cooling cover of the apparatus for cooling a coil of a motor in accordance with the first embodiment of the present disclosure.

Referring to FIGS. 3 to 5, the first cooling cover 2A in accordance with the first embodiment of the present disclosure includes a cooling cap unit 10, an inlet flow path unit 20, an outlet flow path unit 30, and a cap fixing unit 40.

The cooling cap unit 10 is a device unit which covers the end coil 4a of the stator coil bundle 4 and is coupled to the stator 3, and has therein an inner space part capable of accommodating the end coil 4a. The end coil 4a is continuously disposed in a circular path along the stator 3 which has a circular sectional shape, and the cooling cap unit 10 has a ring shape corresponding thereto. An opening into which the end coil 4a may be inserted is formed at one end of the cooling cap unit 10.

The inner space part of the cooling cap unit 10 forms a flow path through which fluid introduced into the cooling cap unit 10 may flow. The fluid introduced into the cooling cap unit 10 exchanges heat with stator coils 4b which form the stator coil bundle 4, by being in contact with the stator coils 4b, and flows along a circular path in an extending direction of the cooling cap unit 10 while passing between the stator coils 4b.

The inlet flow path unit 20 is a device unit forming an inlet passage through which fluid is introduced into the cooling cap unit 10, and is formed at the lower part of the cooling cap unit 10 to communicate with the inside of the cooling cap unit 10. The outlet flow path unit 30 is a device unit forming an outlet passage through which fluid is discharged to the outside of the cooling cap unit 10, and is formed at the upper part of the cooling cap unit 10 to communicate with the inside of the cooling cap unit 10.

By disposing the inlet flow path unit 20 at the lower part of the cooling cap unit 10 and disposing the outlet flow path unit 30 at the upper part of the cooling cap unit 10, air introduced into the cooling cap unit 10 through the inlet flow path unit 20 may flow upward by a thrust force applied when the air is introduced into the cooling cap unit 10. In addition, as a temperature of the air rises due to heat exchange with the stator coil bundle 4 while the air passes through the inside of the cooling cap unit 10, the air is additionally applied with an upward flowing force, and thus, it is possible to adjust air supply and discharge with high energy efficiency.

Referring to FIG. 5, the inlet flow path unit 20 and the outlet flow path unit 30 obliquely extend in a tangential direction of a concentric circle which has the same center as the stator 3. That is to say, the inlet flow path unit 20 and the outlet flow path unit 30 have extending directions parallel to the tangential direction of the stator 3. The extending directions of the inlet flow path unit 20 and the outlet flow path unit 30 mean directions of extension lines of the widthwise center parts of the inlet flow path unit 20 and the outlet flow path unit 30. Hereinafter, for the sake of convenience in explanation, a direction parallel to the tangential direction of the stator 3 is also referred to as a 'tangential direction of the stator 3.'

By forming the inlet flow path unit 20 to extend in the tangential direction of the stator 3, the loss of an air flow force due to the interference between the extending direction of the inner wall part of the cooling cap unit 10 and a flow direction of air may be minimized, and a cooling function may be evenly realized over the entire end coil 4a while stably and clearly flowing introduced air through the circular path along the cooling cap unit 10. The outlet flow path unit 30 extends in a direction to discharge the air inside the cooling cap unit 10.

The cap fixing unit 40 is a device unit for fixing the cooling cap unit 10 to the stator 3 or a motor housing 6. The cap fixing unit 40 has a closed type, for example, circular, contact surface which may be brought into continuous contact with the stator 3 having a circular shape, and may be airtightly coupled to both axial ends of the stator 3 by locking members, coupling members or the likes.

Referring to FIGS. 3 to 5, the cooling cap unit 10 of the first cooling cover 2A in accordance with the first embodiment of the present disclosure includes an inner cover section 11, an outer cover section 12, and an end cover section 13.

The inner cover section 11 is a device section which forms an inner diameter section of the first cooling cover 2A, and is disposed to face the inner diameter section of the stator coil bundle 4. The outer cover section 12 is a device section which forms an outer diameter section of the first cooling cover 2A, and is disposed to face the outer diameter section of the stator coil bundle 4. In a state in which the first cooling cover 2A is installed on the axial end of the stator 3, the inner cover section 11 is disposed close to the inner diameter section of the stator 3, and the outer cover section 12 is disposed close to the outer diameter section of the stator 3.

The end cover section 13 interconnects the ends of the inner cover section 11 and the outer cover section 12, and forms a hollow flow path between the inner cover section 11 and the outer cover section 12. A ring-shaped space section as the flow path is formed among the inner cover section 11, the outer cover section 12 and the end cover section 13, and the opening into which the end coil 4a may be inserted is formed at one ends of the inner cover section 11 and the outer cover section 12 which are not covered by the end cover section 13.

Referring to FIGS. 3 to 5, the inlet flow path unit 20 of the first cooling cover 2A in accordance with the first embodiment of the present disclosure includes a cap connection inlet section 21 and an extended inlet section 25.

The cap connection inlet section 21 is a device section of the inlet flow path unit 20 which is connected with the cooling cap unit 10, is formed to communicate with the inside of the cooling cap unit 10, and extends in the tangential direction of the stator 3. The cap connection inlet section 21 of the first cooling cover 2A in accordance with the first embodiment of the present disclosure includes an inlet hole part 22, a first inlet wall part 23, and a second inlet wall part 24.

The inlet hole part 22 is formed to be open at the lower part of the outer cover section 12. The cooling cap unit 10 and the inlet flow path unit 20 are connected through the inlet hole part 22 to communication with each other. The first inlet wall part 23 extends in the tangential direction of the stator 3 at one side of the inlet hole part 22. The second inlet wall part 24 is disposed at the other side of the inlet hole part 22 to face the first inlet wall part 23, and extends in the tangential direction of the stator 3.

Among the separation distances between the first inlet wall part 23 and the second inlet wall part 24, a continuous connection of middle points may represent an extending direction of the cap connection inlet section 21. By the first inlet wall part 23 and the second inlet wall part 24 of the cap connection inlet section 21, air introduced between the first inlet wall part 23 and the second inlet wall part 24 in the tangential direction of the stator 3 flows in the tangential direction of the stator 3, and is introduced into the cooling cap unit 10 through the inlet hole part 22.

The extended inlet section 25 is a device section which is connected with fluid supply devices 60, 70 and 80 which supply, discharge and circulate fluid, such as an air supply device 60, a vehicle behavior stabilization device 70 and an oil circulation device 80 (to be described later). The extended inlet section 25 is connected with the cap connection inlet section 21, and extends to the outside of the motor housing 6 through the motor housing 6 (see FIG. 7) or is connected with the ends of the fluid supply devices 60, 70 and 80 which extend into the inside of the motor housing 6.

Referring to FIGS. 3 to 5, the outlet flow path unit 30 of the first cooling cover 2A in accordance with the first embodiment of the present disclosure includes a cap connection outlet section 31 and an extended outlet section 35.

The cap connection outlet section 31 is a device section of the outlet flow path unit 30 which is connected with the cooling cap unit 10, is formed to communicate with the inside of the cooling cap unit 10, extends in the tangential direction of the stator 3, and is formed to be open in a direction parallel to the cap connection inlet section 21. In detail, in FIG. 5, the cap connection inlet section 21 has a shape which is inclined downward toward the left, and the upper end thereof is connected to the lower part of the cooling cap unit 10. The cap connection outlet section 31 has a shape which is inclined upward toward the right, and the lower end thereof is connected to the upper part of the cooling cap unit 10.

As the inlet flow path unit 20 and the outlet flow path unit 30 are formed to be open in parallel directions, when compared to the case where the inlet flow path unit 20 and the outlet flow path unit 30 are formed to be open in unparallel directions, air introduced into the cooling cap unit 10 does not have a flow path of a short distance (half a turn of the cooling cap unit 10) corresponding to a distance from the inlet flow path unit 20 to the outlet flow path unit 30, but has a long time flow pattern with a long distance extending one more turn of the inside of the cooling cap unit 10 through passing by the outlet flow path unit 30. Accordingly, the flow of air may be made more stably throughout the entire end coil 4a which is disposed in a circular shape.

The cap connection outlet section 31 of the first cooling cover 2A in accordance with the first embodiment of the present disclosure includes an outlet hole part 32, a first outlet wall part 33 and a second outlet wall part 34. Since they have structures corresponding to the inlet hole part 22, the first inlet wall part 23 and the second inlet wall part 24, respectively, of the cap connection inlet section 21, repeated descriptions thereof will be omitted.

The extended outlet section 35 is a device section which is connected with the fluid supply devices 60, 70 and 80. The extended outlet section 35 is connected to the cap connection outlet section 31 to communicate therewith, and extends to the outside of the motor housing 6 through the motor housing 6 (see FIG. 7) or is connected with the ends of the fluid supply devices 60, 70 and 80 which extend into the inside of the motor housing 6.

Figure 6:
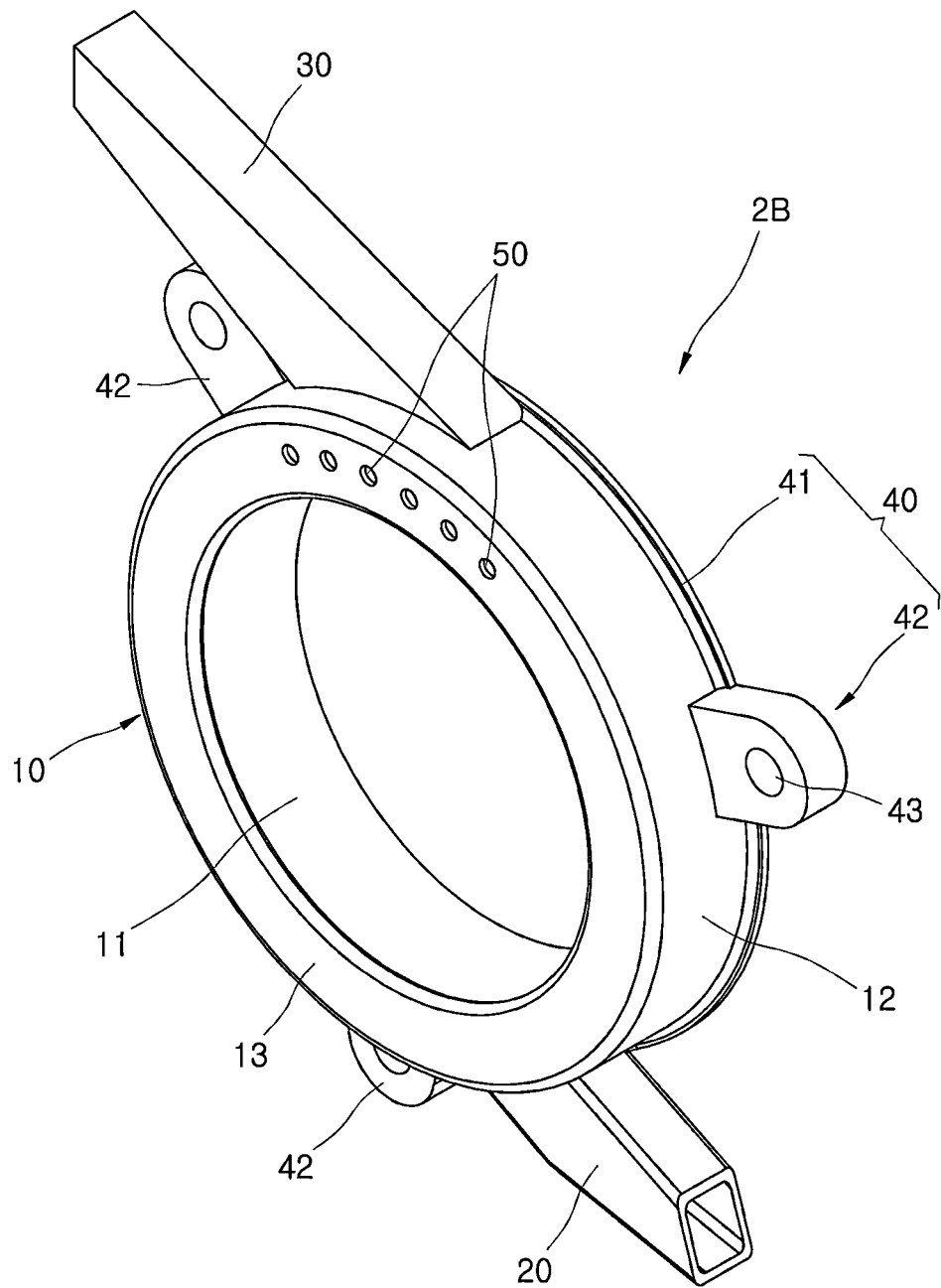
FIG. 6 is a perspective view schematically illustrating a second cooling cover of the apparatus for cooling a coil of a motor in accordance with the first embodiment of the present disclosure.

FIG. 6 is a perspective view schematically illustrating the second cooling cover of the apparatus for cooling a coil of a motor in accordance with the first embodiment of the present disclosure.

Referring to FIG. 6, the second cooling cover 2B of the coil cooling apparatus 2 of the motor 1 in accordance with the first embodiment of the present disclosure has a difference in terms of the shape of the outlet flow path unit 30 when compared to the first cooling cover 2A of the coil cooling apparatus 2 of the motor 1 in accordance with the first embodiment of the present disclosure.

The first cooling cover 2A of the coil cooling apparatus 2 of the motor 1 in accordance with the first embodiment of the present disclosure has a structure in which the cap connection outlet section 31 and the extended outlet section 35 are formed to extend in different directions. In comparison with this, the second cooling cover 2B of the coil cooling apparatus 2 of the motor 1 in accordance with the first embodiment of the present disclosure has a shape in which the cap connection outlet section 31 and the extended outlet section 35 continuously extend in one direction and a width gradually decreases toward an outlet end.

As the extending directions of the cap connection outlet section 31 and the extended outlet section 35 are placed on a straight line, when air is discharged in a predetermined direction (in the extending direction of the cap connection outlet section 31 and the extended outlet section 35), loss due to switching of a flow direction may be minimized. As the cap connection outlet section 31 and the extended outlet section 35 are formed to have the shape in which a width gradually decreases toward the outlet end, air may be discharged at a high speed with a high pressure. The high-speed and high-pressure air having a specific directionality as described above may be usefully utilized for controlling air flow on the surface of a vehicle or for cooling other vehicle parts.

Also, the second cooling cover 2B of the coil cooling apparatus 2 of the motor 1 in accordance with the first embodiment of the present disclosure has a difference that the second cooling cover 2B further includes coil passage hole parts 50, when compared to the first cooling cover 2A of the coil cooling apparatus 2 of the motor 1 in accordance with the first embodiment of the present disclosure.

The coil passage hole parts 50 are device parts forming passages through which the stator coils 4b configuring the stator coil bundle 4 may pass, and are formed through the cooling cap unit 10. The stator coil bundle 4 is formed by repeating, a plurality of times, that the plurality of stator coils 4b extend in the axial direction of the stator 3, project out of the stator 3 and are oppositely switched in their directions.

The plurality of coil passage hole parts 50 have a size corresponding to the diameter and width of the stator coils 4b, and have a structure in which they are disposed to be spaced apart from one another. The number of the coil passage hole parts 50 corresponds to both ends of the plurality of stator coils 4b, that is, corresponding to the inlet ends and outlet ends of the plurality of stator coils 4b. The coil passage hole parts 50 are disposed to be spaced apart from one another so that the stator coils 4b do not electrically interfere with one another. The stator coils 4b are stably supported at predetermined positions by the coil passage hole parts 50, and are connected to power connection terminals or the likes in a state in which they extend in predetermined directions that do not interfere with one another.

Referring to FIGS. 1, 3 and 4, the cap fixing unit 40 of each of the first cooling cover 2A and the second cooling cover 2B in accordance with the first embodiment of the present disclosure includes a flange section 41 and housing coupling sections 42.

The flange section 41 is formed to radially project along the circumference of an open end 14 of the cooling cap unit 10 which faces the stator 3. By the flange section 41, the cooling cap unit 10 may be reliably brought into contact with the stator 3, and may stably secure a contact surface with the stator 3. As long as the flange section 41 may be brought into close contact with the stator 3, its width may be variously changed. By forming, through the flange section 41, holes through which locking bolts or the likes may pass, the flange section 41 may be tightly fitted into or fixed to the stator 3 by using locking bolts.

Figure 7:
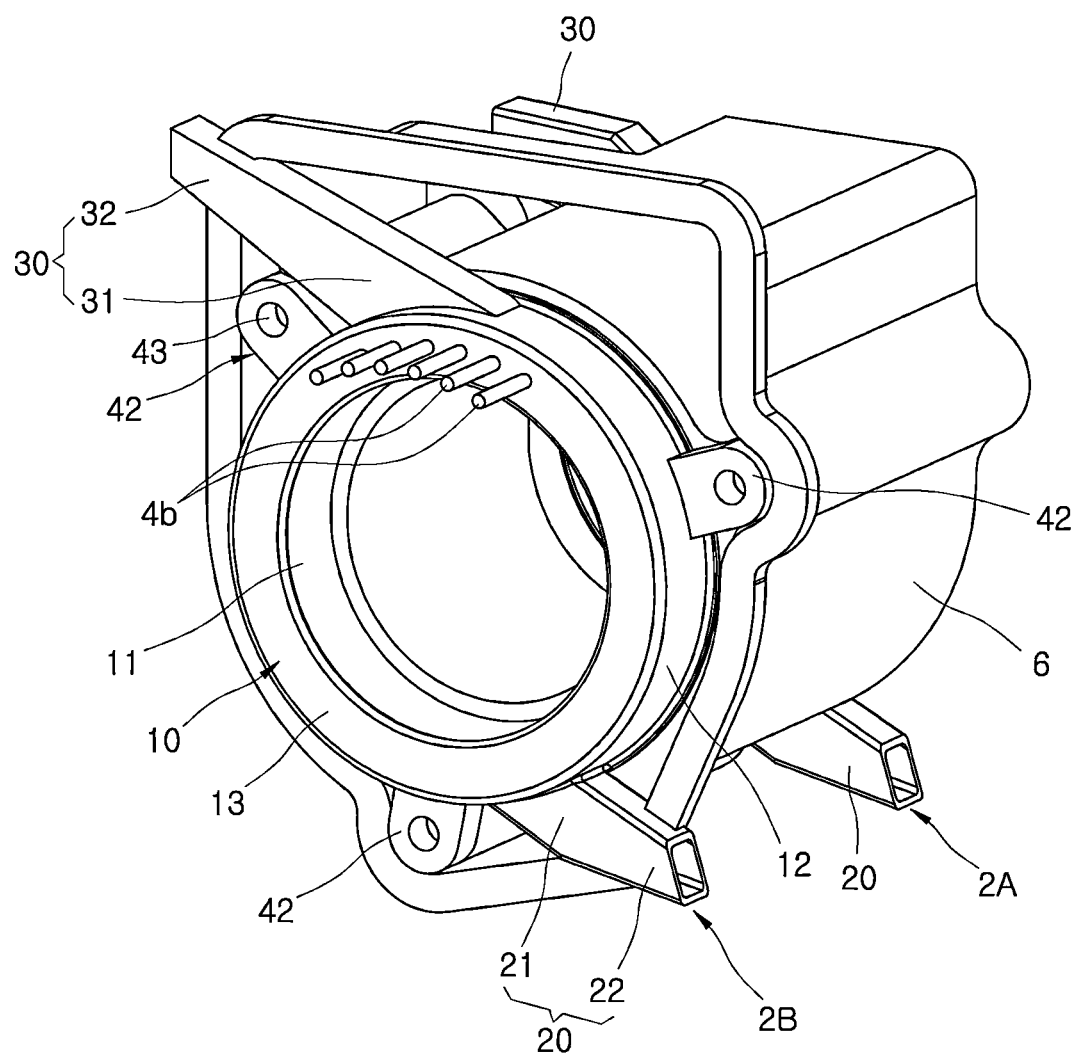
FIG. 7 is a perspective view illustrating an installation state in which the apparatus for cooling a coil of a motor in accordance with the first embodiment of the present disclosure is coupled to a motor housing.
Figure 8:
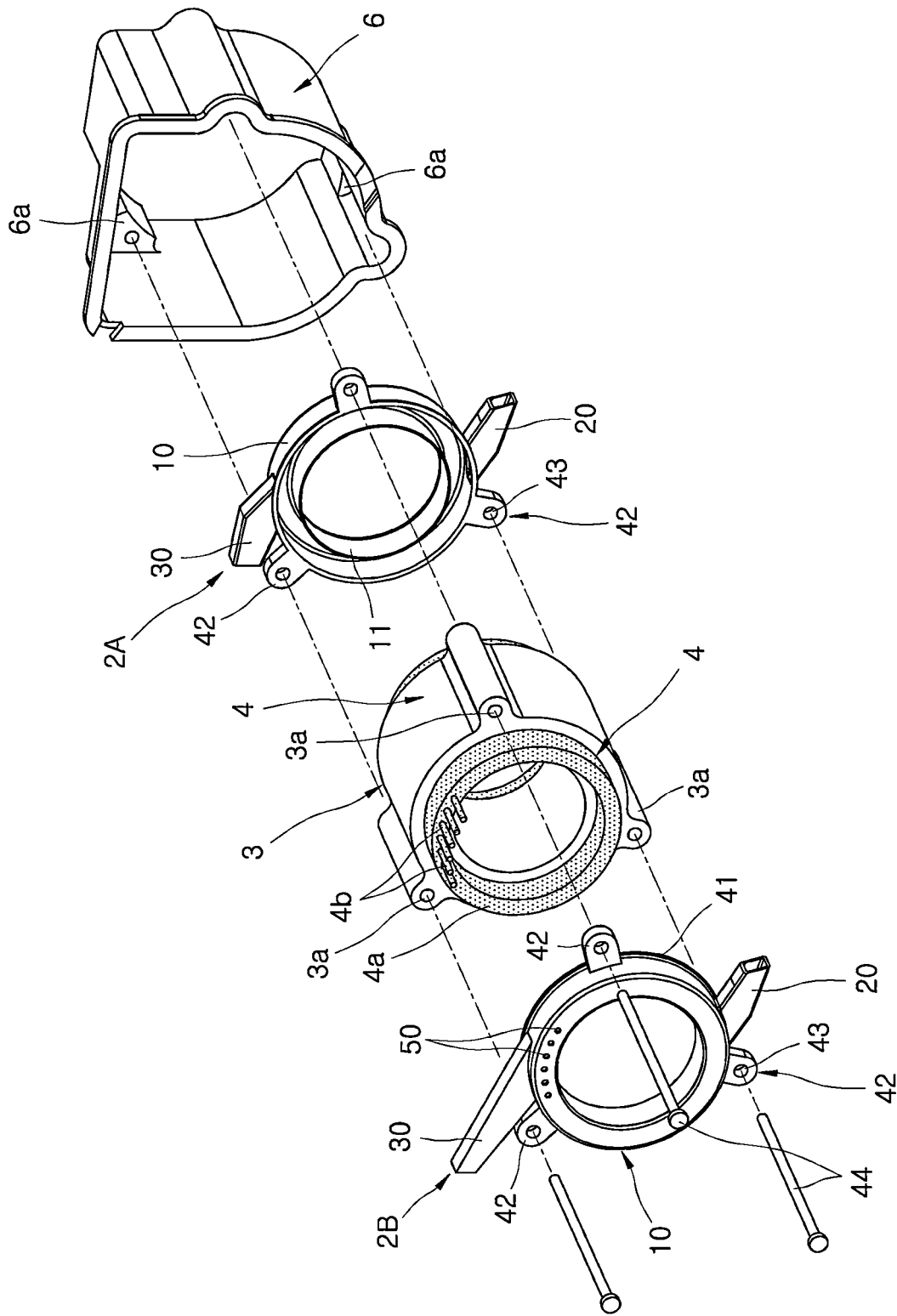
FIG. 8 is an exploded perspective view of FIG. 7.

FIG. 7 is a perspective view illustrating an installation state in which the apparatus for cooling a coil of a motor in accordance with the first embodiment of the present disclosure is coupled to the motor housing, and FIG. 8 is an exploded perspective view of FIG. 7.

Referring to FIGS. 1 and 8, a plurality of housing locking hole parts 3a are formed on the stator 3 to extend in an axial direction, in order for coupling of the stator 3 with the motor housing 6. The housing locking hole parts 3a are disposed at a predetermined interval along the circumference of the stator 3, and stator coupling parts 6a are formed in the motor housing 6 at positions corresponding to the housing locking hole parts 3a. The housing coupling sections 42 are formed on the outer cover section 12 of the cooling cap unit 10 to radially project, and have structures in which fixing hole parts 43 are formed at positions corresponding to the housing locking hole parts 3a formed on the stator 3.

In a state in which the first cooling cover 2A and the second cooling cover 2B are disposed at both axial ends of the stator 3 and the housing locking hole parts 3a and the fixing hole parts 43 are positioned on the same axis, each of cap fixing members 44 having pin or bolt structures capable of continuously passing through the housing locking hole parts 3a and the fixing hole parts 43 is locked and coupled to the stator coupling part 6a formed in the motor housing 6, by passing through a pair of housing locking hole part 3a and fixing hole part 43. As a consequence, the first cooling cover 2A and the second cooling cover 2B may be fixed in place on the motor housing 6 together with the stator 3.

By designing the inner space part of the motor housing 6 so as not to have a clearance with respect to the motor housing 6 in the extending direction of the cap fixing members 44, the first cooling cover 2A and the second cooling cover 2B may be locked and fixed to the motor housing 6 by the cap fixing members 44, and at the same time, may be tightly fitted into or fixed to both axial ends of the stator 3.

Figure 9:
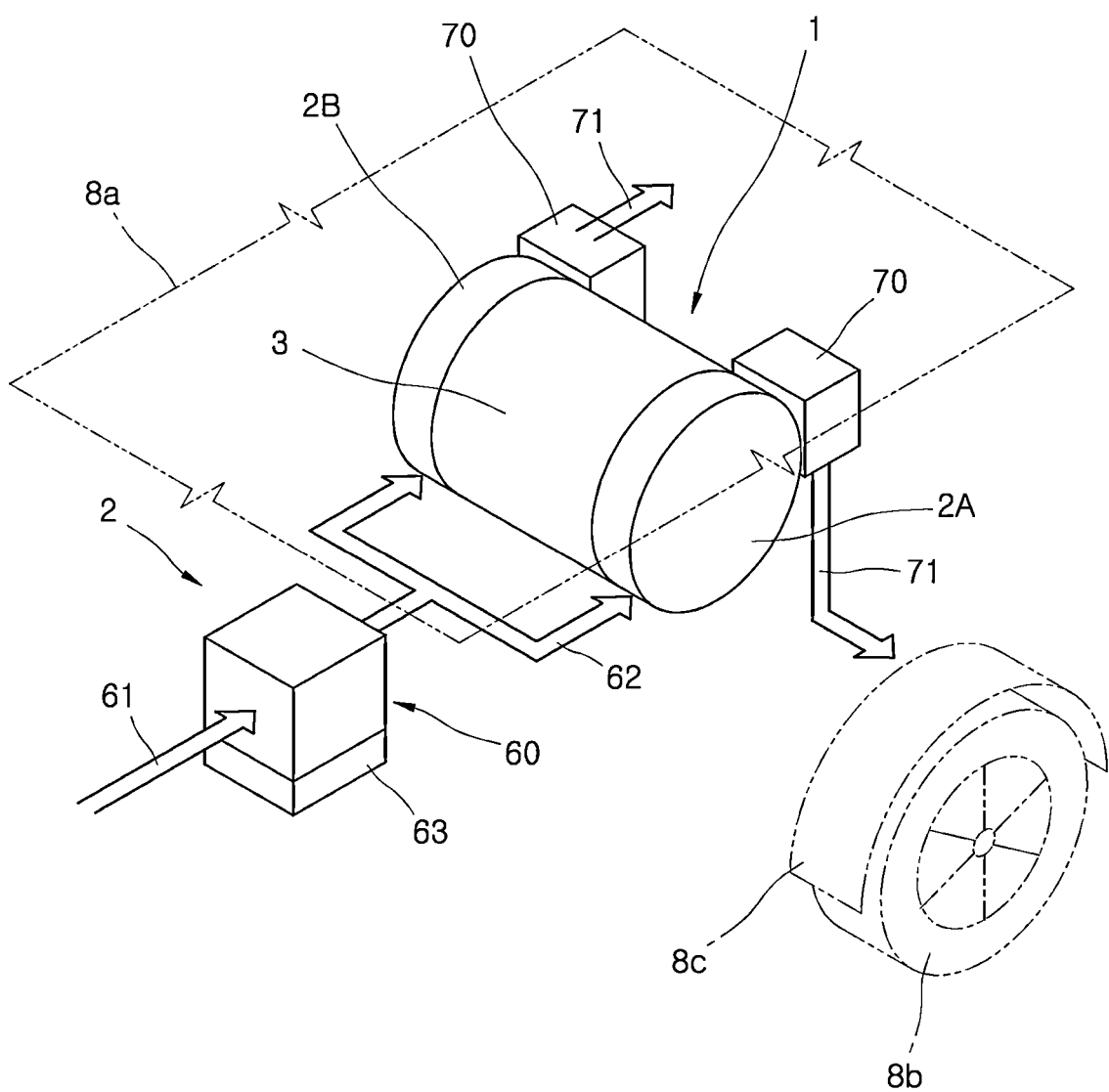
FIG. 9 is a conceptual diagram to assist in the explanation of an example in which air is applied as a coolant of the apparatus for cooling a coil of a motor in accordance with the first embodiment of the present disclosure.

FIG. 9 is a conceptual diagram to assist in the explanation of an example in which air is applied as a coolant of the apparatus for cooling a coil of a motor in accordance with the first embodiment of the present disclosure.

In the case where air is applied as a coolant of the coil cooling apparatus 2 of the motor 1 in accordance with the first embodiment of the present disclosure, air may be supplied to the inlet flow path unit 20 using the air supply device 60. The air supply device 60 has an air inlet path 62 which extends to the inlet flow path unit 20. As the air supply device 60 is disposed on a path through which outside air is introduced into the inside of a vehicle, that is, on an outside air inlet path 61, outside air as the coolant may be supplied to the inlet flow path unit 20.

The air supply device 60 may be connected to the inlet flow path unit 20 by including a supercharger 63 which supplies air to the inlet flow path unit 20 at a pressure equal to or higher than the atmospheric pressure. By disposing the air supply device 60 including the supercharger 63 on the outside air inlet path 61 as illustrated in FIG. 9, outside air and the supercharger 63 may be selectively utilized depending on necessity, efficiency, etc.

Further, in the case where air is applied as a coolant of the coil cooling apparatus 2 of the motor 1 in accordance with the first embodiment of the present disclosure, by using the vehicle behavior stabilization device 70 having an air outlet flow path 71 which extends to a bonnet 8a of the vehicle or extends between a tire 8 and a fender 8c, stability of the behavior of the vehicle may be realized when the vehicle is driven at a high speed. As the vehicle travels at a high speed, high-speed air flow is created on the top of the bonnet 8a of the vehicle and between the tire 8b and the fender 8c, which applies a lift force to lift the vehicle from the ground.

By exhausting air, discharged from the outlet flow path unit 30, to the bonnet 8a of the vehicle or between the tire 8b and the fender 8c by using the vehicle behavior stabilization device 70, a downward force corresponding to a lift force acting on the vehicle when the vehicle runs at a high speed, in particular, a down force, may be applied. If a grounding pressure of the tire 8b decreases due to the action of the lift force, the steering wheel operability and the steering stability are deteriorated. By applying, as described above, a down force through using the vehicle behavior stabilization device 70, the contact stability between a vehicle body and the ground and the driving stability may be improved.

Figure 10:
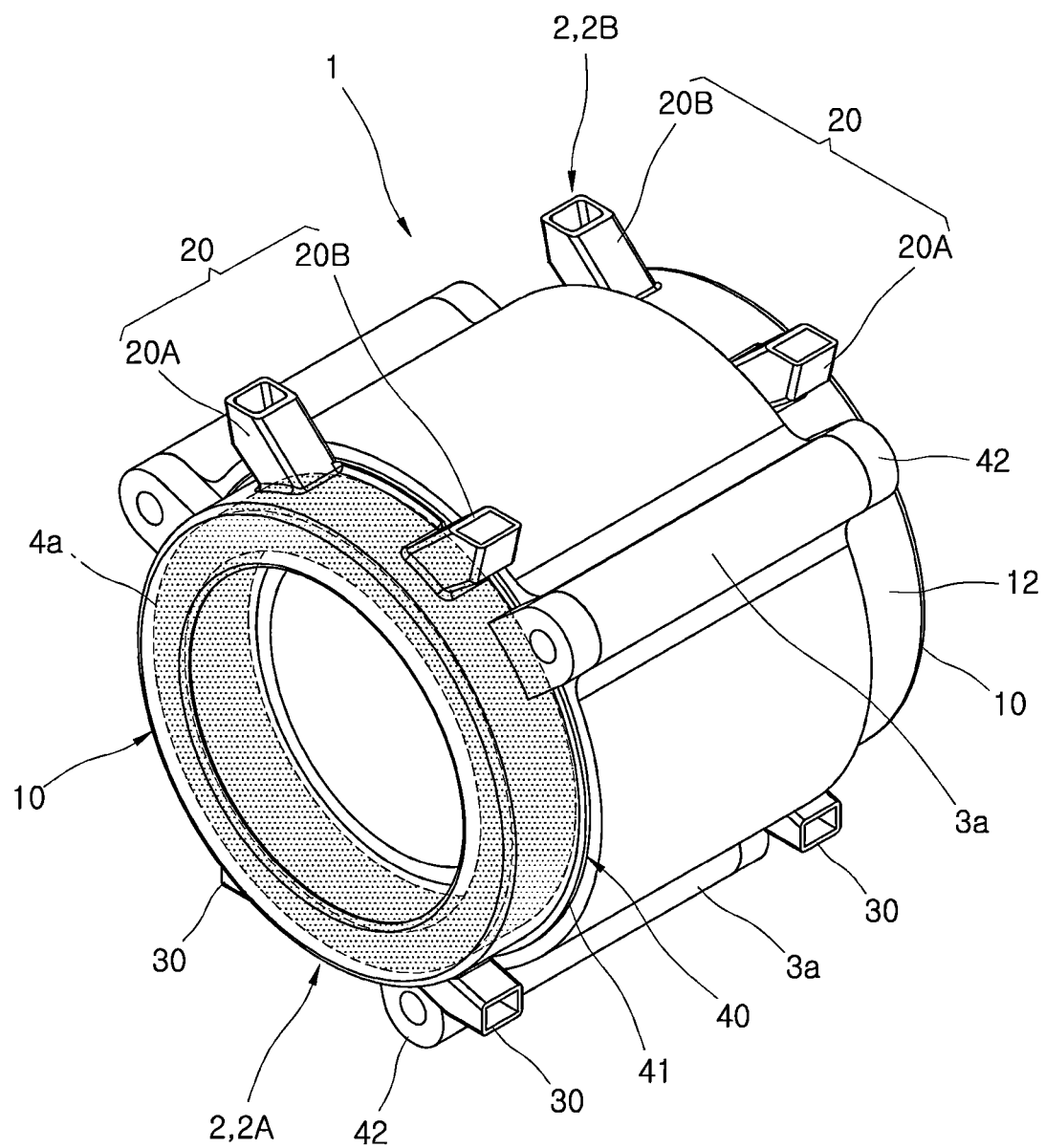
FIG. 10 is a perspective view illustrating a state in which an apparatus for cooling a coil of a motor in accordance with a second embodiment of the present disclosure is installed on a stator.

FIG. 10 is a perspective view illustrating a state in which an apparatus for cooling a coil of a motor in accordance with a second embodiment of the present disclosure is installed on a stator.

Hereinafter, in describing the coil cooling apparatus 2 of the motor 1 in accordance with the second embodiment of the present disclosure with reference to FIGS. 10 to 14, description of components corresponding to those of the coil cooling apparatus 2 of the motor 1 in accordance with the first embodiment of the present disclosure will be omitted. While the coil cooling apparatus 2 of the motor 1 in accordance with the first embodiment of the present disclosure has a structure suitable for applying air as a coolant, the coil cooling apparatus 2 of the motor 1 in accordance with the second embodiment of the present disclosure has a structure suitable for applying oil as a coolant.

Referring to FIG. 10, in the coil cooling apparatus 2 of the motor 1 in accordance with the second embodiment of the present disclosure, when compared to the coil cooling apparatus 2 in accordance with the first embodiment of the present disclosure, the first cooling cover 2A and the second cooling cover 2B have the same structure, and are coupled to both axial ends of the stator 3.

Figure 11:
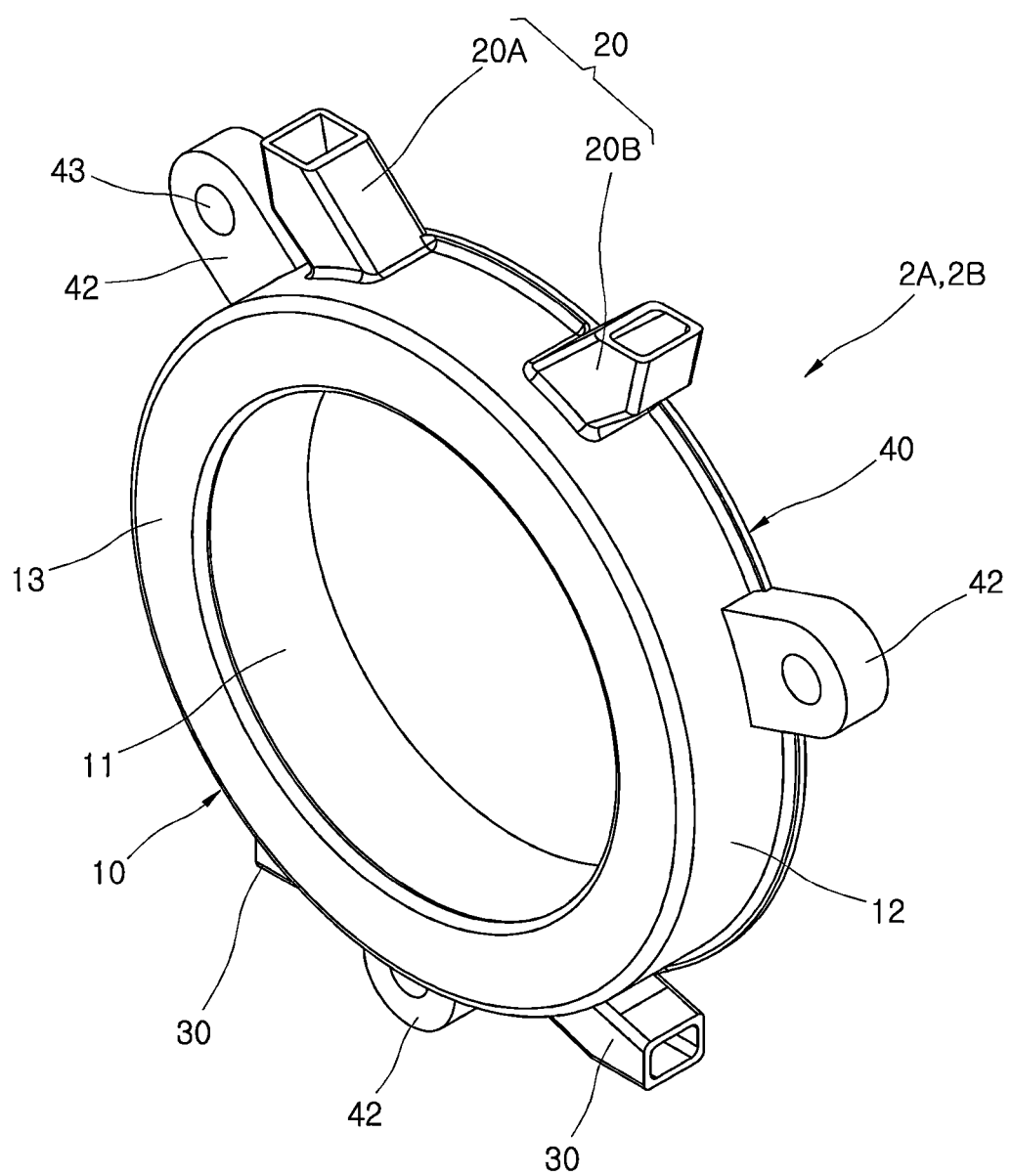
FIG. 11 is a perspective view illustrating a first cooling cover of the apparatus for cooling a coil of a motor in accordance with the second embodiment of the present disclosure.
Figure 12:
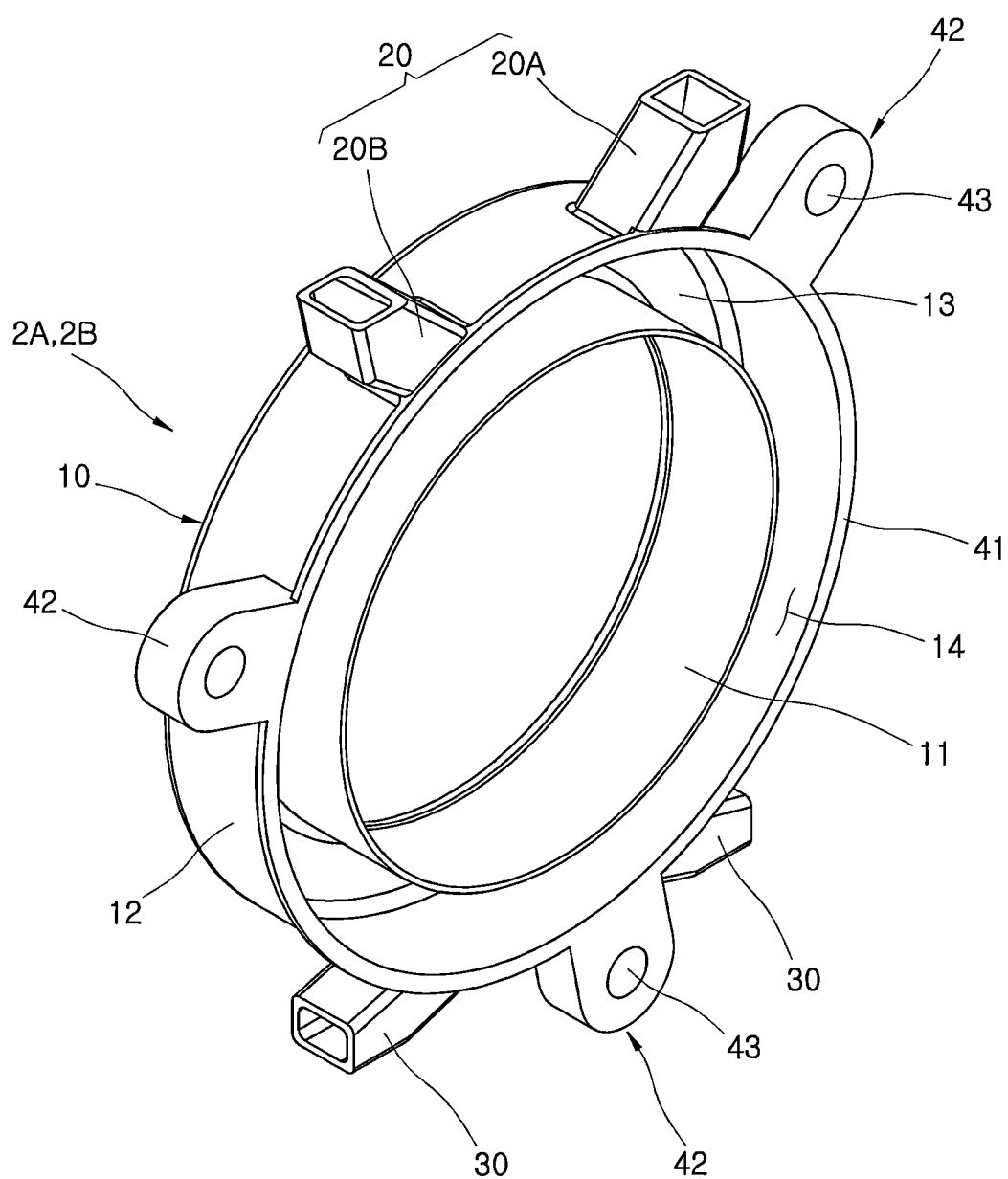
FIG. 12 is a perspective view illustrating, in a direction different from FIG. 10, the first cooling cover of the apparatus for cooling a coil of a motor in accordance with the second embodiment of the present disclosure.
Figure 13:
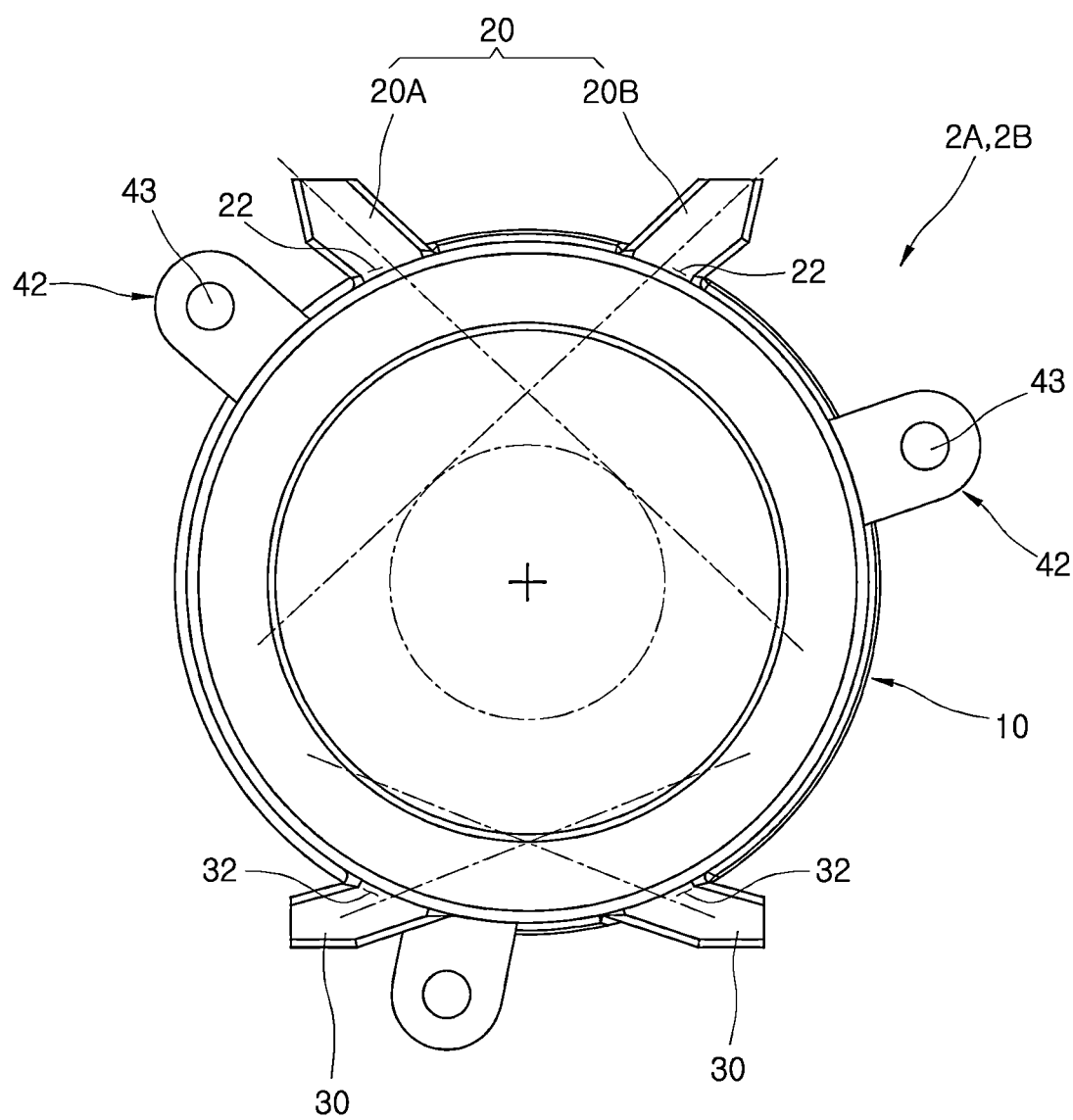
FIG. 13 is a front view schematically illustrating the first cooling cover of the apparatus for cooling a coil of a motor in accordance with the second embodiment of the present disclosure.

FIG. 11 is a perspective view illustrating the first cooling cover of the apparatus for cooling a coil of a motor in accordance with the second embodiment of the present disclosure, FIG. 12 is a perspective view illustrating, in a direction different from FIG. 10, the first cooling cover of the apparatus for cooling a coil of a motor in accordance with the second embodiment of the present disclosure, and FIG. 13 is a front view schematically illustrating the first cooling cover of the apparatus for cooling a coil of a motor in accordance with the second embodiment of the present disclosure.

Referring to FIGS. 11 to 13, the first cooling cover 2A and the second cooling cover 2B in accordance with the second embodiment of the present disclosure have, when compared to the coil cooling apparatus 2 in accordance with the first embodiment of the present disclosure, a structure in which the inlet flow path unit 20 and the outlet flow path unit 30 are disposed at the upper and lower parts, respectively, of the cooling cap unit 10 and a plurality of inlet flow path units 20 and a plurality of outlet flow path units 30 are formed.

In accordance with the second embodiment of the present disclosure, the inlet flow path unit 20 is formed at the upper part of the cooling cap unit 10 to communicate with the inside of the cooling cap unit 10, and the outlet flow path unit 30 is formed at the lower part of the cooling cap unit 10 to communicate with the inside of the cooling cap unit 10. By disposing the inlet flow path unit 20 at the upper part of the cooling cap unit 10 and disposing the outlet flow path unit 30 at the lower part of the cooling cap unit 10, oil introduced into the cooling cap unit 10 through the inlet flow path unit 20 may flow downward by a thrust force applied when the oil is introduced into the cooling cap unit 10. In addition, as the oil is additionally applied with a downward force naturally by its own weight, it is possible to adjust oil supply and discharge with high energy efficiency.

Each of the first cooling cover 2A and the second cooling cover 2B in accordance with the second embodiment of the present disclosure includes a first inlet flow path unit 20A and a second inlet flow path unit 20B. The first inlet flow path unit 20A is connected to the upper part of the cooling cap unit 10 to be inclined downward in a clockwise direction. The second inlet flow path unit 20B is disposed at the upper part of the cooling cap unit 10 in opposition to the first inlet flow path unit 20A, and is formed to be inclined downward in a counterclockwise direction. The first inlet flow path unit 20A and the second inlet flow path unit 20B extend in directions intersecting with each other.

Accordingly, one part of oil introduced into the first inlet flow path unit 20A is introduced in an inclined manner in the extending direction of the first inlet flow path unit 20A, that is, the clockwise direction, and moves downward while flowing in the clockwise direction in the cooling cap unit 10, and the other part of the oil introduced into the first inlet flow path unit 20A is converted in its flow direction to the counterclockwise direction due to interference with oil introduced in the counterclockwise direction through the second inlet flow path unit 20B and moves downward while flowing in the counterclockwise direction in the cooling cap unit 10.

Even in oil introduced through the second inlet flow path unit 20B, by the same action as the oil introduced into the first inlet flow path unit 20A, one part and the other part of the oil reach the lower part of the cooling cap unit 10 while passing through the inside of the cooling cap unit 10 in the clockwise direction and the counterclockwise direction, respectively, and are discharged through the plurality of outlet flow path units 30.

Figure 14:
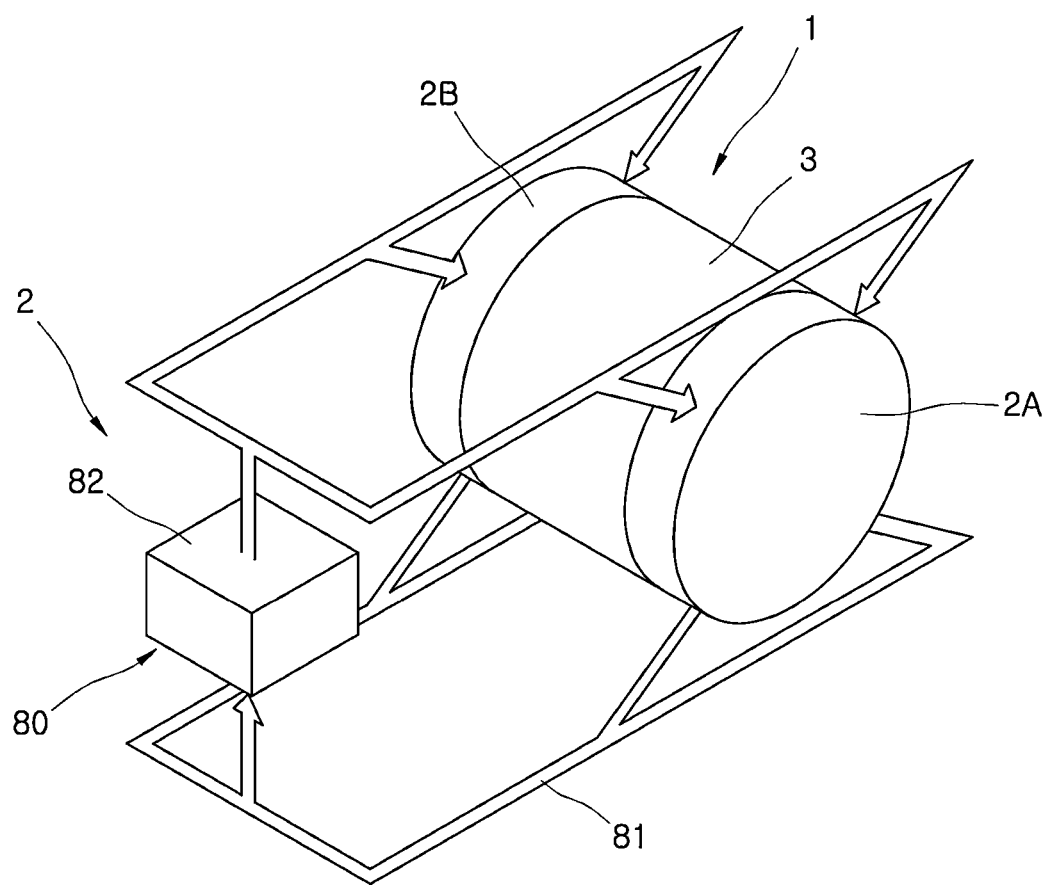
FIG. 14 is a conceptual diagram to assist in the explanation of an example in which oil is applied as a coolant of the apparatus for cooling a coil of a motor in accordance with the second embodiment of the present disclosure.

FIG. 14 is a conceptual diagram to assist in the explanation of an example in which oil is applied as a coolant of the apparatus for cooling a coil of a motor in accordance with the second embodiment of the present disclosure.

In the case where oil is applied as a coolant of the coil cooling apparatus 2 of the motor 1 in accordance with the second embodiment of the present disclosure, oil discharged from the outlet flow path unit 30 may be supplied and circulated to the inlet flow path unit 20 by using the oil circulation device 80, whereby a cooling function may be stably realized. The oil circulation device 80 includes an oil flow path 81 which extends from the inlet flow path unit 20 to the outlet flow path unit 30 and an oil pump 82 which is installed on the oil flow path 81.

One end of the oil flow path 81 is connected to the inlet flow path unit 20, the other end of the oil flow path 81 is connected to the outlet flow path unit 30, and the oil pump 82 is disposed in the middle of the oil flow path 81. When the oil pump 82 is driven, oil flow for supplying oil, discharged from the outlet flow path unit 30, to the inlet flow path unit 20 may be forcibly formed, and in connection with this, oil flow to the outlet flow path unit 30 through the cooling cap unit 10 from the inlet flow path unit 20 may be stably realized.

As is apparent from the above description, in the coil cooling apparatus 2 of the motor 1 according to the embodiments of the present disclosure, configured as mentioned above, the end coil 4a of the stator coil bundle 4 is covered with the cooling cap unit 10, fluid is supplied into the cooling cap unit 10 through the inlet flow path unit 20, and the fluid having passed through the inside of the cooling cap unit 10 is discharged through the outlet flow path unit 30. As a consequence, it is possible to concentratedly and directly cool the end coil 4a of the stator coil bundle 4 from which a largest amount of heat is generated in the motor 1 and to uniformly cool the entirety of end coils 4a.

Accordingly, in the embodiments of the present disclosure, the cooling efficiency and cooling reliability of stator coils 4b may be secured. Also, it is possible to increase the output of the motor 1 of a vehicle that cannot help but be limited to prevent damage due to heat generation of the stator coils 4b when the vehicle is driven at high speed. As a consequence, it is possible to achieve high output of the motor 1 for driving the vehicle.

In addition, the coil cooling apparatus 2 of the motor 1 according to the embodiments of the present disclosure may be easily applied by simply coupling cap-shaped compact components, which may be coupled to both ends of the stator 3 in an axial direction, to both ends of the stator 3, and may be universally applied in parallel with air-cooling type, water-cooling type and oil-cooling type cooling devices which are applied to cool the stator 3, a rotor (not illustrated) and a rotor coil (not illustrated) in the existing art.

Although the present disclosure has been disclosed with reference to the embodiments illustrated in the drawings, the embodiments are only for illustrative purposes, and those skilled in the art will appreciate that various modifications and other equivalent embodiments are possible, without departing from the scope and spirit of the present disclosure as defined in the accompanying claims. Thus, the true technical scope of the present disclosure should be defined by the following claims.

What is claimed is:

1. An apparatus for cooling a coil of a motor, comprising:
    a cooling cap unit covering an end coil of a stator coil bundle, coupled to a stator, and having, formed therein, a flow path through which fluid is able to flow;
    an inlet flow path unit formed at one part of the cooling cap unit, and forming an inlet path through which fluid is introduced into the cooling cap unit, wherein the inlet flow path unit is disposed at a lower part of the cooling cap unit and obliquely extends in a tangential direction of a concentric circle which has a same center as the stator;
    an outlet flow path unit formed at the other part of the cooling cap unit, wherein the outlet flow path unit is disposed at an upper part of the cooling cap unit on an opposite side of the concentric circle to the inlet flow path unit, obliquely extends in the tangential direction of the concentric circle, and forms an outlet path through which fluid is discharged to an outside of the cooling cap unit; and
    a cap fixing unit fixing the cooling cap unit to the stator or a motor housing,
    wherein the inlet flow path unit comprises:
    a first inlet flow path unit connected to the cooling cap unit to be inclined downward in a clockwise direction; and
    a second inlet flow path unit disposed in opposition to the first inlet flow path unit, and formed to be inclined downward in a counterclockwise direction.

2. The apparatus according to claim 1, wherein the cooling cap unit comprises:
    an inner cover section disposed to face an inner diameter section of the stator coil bundle;
    an outer cover section disposed to face an outer diameter section of the stator coil bundle; and
    an end cover section connecting ends of the inner cover section and the outer cover section, and forming a hollow flow path between the inner cover section and the outer cover section.

3. The apparatus according to claim 1, wherein the inlet flow path unit comprises:
    a cap connection inlet section connected with the cooling cap unit, and communicating with an inside of the cooling cap unit; and
    an extended inlet section connected with the cap connection inlet section, and extending to an outside of a motor housing by passing through the motor housing or connected with a fluid supply device which extends into the motor housing.

4. The apparatus according to claim 1, wherein the cap fixing unit comprises:
a flange section formed at an open end of the cooling cap unit to radially project, and brought into contact with the stator.

5. The apparatus according to claim 1, wherein the cap fixing unit comprises:
housing coupling sections formed on the cooling cap unit to radially project, and defined with fixing hole parts at positions corresponding to housing locking hole parts which are formed on the stator.

6. The apparatus according to claim 1, further comprising:
coil passage hole parts formed through the cooling cap unit so that stator coils pass through the coil passage hole parts and extend to the outside of the cooling cap unit.

7. The apparatus according to claim 1, further comprising:
a vehicle behavior stabilization device connected to the outlet flow path unit, and exhausting air discharged from the outlet flow path unit to a bonnet of a vehicle or between a tire and a fender to apply a downward force to the vehicle.

8. The apparatus according to claim 1, further comprising:
an oil circulation device having one end which is connected to the inlet flow path unit and an other end which is connected to the outlet flow path unit, and including an oil pump which circulates oil, discharged from the outlet flow path unit, to the inlet flow path unit.

9. An apparatus for cooling a coil of a motor, comprising:
a cooling cap unit covering an end coil of a stator coil bundle, coupled to a stator, and having, formed therein, a flow path through which fluid is able to flow;
an inlet flow path unit formed at one part of the cooling cap unit, and forming an inlet path through which fluid is introduced into the cooling cap unit, wherein the inlet flow path unit comprises:
a first inlet flow path unit connected to the cooling cap unit to be inclined downward in a clockwise direction; and
a second inlet flow path unit disposed in opposition to the first inlet flow path unit, and formed to be inclined downward in a counterclockwise direction;
an outlet flow path unit formed at the other part of the cooling cap unit, and forming an outlet path through which fluid is discharged to an outside of the cooling cap unit; and
a cap fixing unit fixing the cooling cap unit to the stator or a motor housing.

10. The apparatus according to claim 9, wherein the cooling cap unit comprises:
an inner cover section disposed to face an inner diameter section of the stator coil bundle;
an outer cover section disposed to face an outer diameter section of the stator coil bundle; and
an end cover section connecting ends of the inner cover section and the outer cover section, and forming a hollow flow path between the inner cover section and the outer cover section.

11. The apparatus according to claim 9, wherein the inlet flow path unit obliquely extends in a tangential direction of a concentric circle which has a same center as the stator.

12. The apparatus according to claim 9, wherein the inlet flow path unit comprises:
a cap connection inlet section connected with the cooling cap unit, and communicating with an inside of the cooling cap unit; and
an extended inlet section connected with the cap connection inlet section, and extending to an outside of a motor housing by passing through the motor housing or connected with a fluid supply device which extends into the motor housing.

13. The apparatus according to claim 9, wherein the inlet flow path unit is disposed at a lower part of the cooling cap unit, and
the outlet flow path unit is disposed at an upper part of the cooling cap unit so that fluid which is increased in its temperature while passing through the inside of the cooling cap unit and thereby flows upward may be discharged through the outlet flow path unit.

14. The apparatus according to claim 9, wherein the inlet flow path unit is disposed at an upper part of the cooling cap unit, and
the outlet flow path unit is disposed at a lower part of the cooling cap unit so that fluid which is increased in its temperature while passing through the inside of the cooling cap unit and thereby flows downward may be discharged through the outlet flow path unit.

15. The apparatus according to claim 9, wherein the cap fixing unit comprises:
a flange section formed at an open end of the cooling cap unit to radially project, and brought into contact with the stator.

16. The apparatus according to claim 9, wherein the cap fixing unit comprises:
housing coupling sections formed on the cooling cap unit to radially project, and defined with fixing hole parts at positions corresponding to housing locking hole parts which are formed on the stator.

17. The apparatus according to claim 9, further comprising:
coil passage hole parts formed through the cooling cap unit so that stator coils pass through the coil passage hole parts and extend to the outside of the cooling cap unit.

18. The apparatus according to claim 9, further comprising:
a vehicle behavior stabilization device connected to the outlet flow path unit, and exhausting air discharged from the outlet flow path unit to a bonnet of a vehicle or between a tire and a fender to apply a downward force to the vehicle.

19. The apparatus according to claim 9, further comprising:
an oil circulation device having one end which is connected to the inlet flow path unit and an other end which is connected to the outlet flow path unit, and including an oil pump which circulates oil, discharged from the outlet flow path unit, to the inlet flow path unit.

* * * * *